(12) United States Patent
Prabhakar et al.

(10) Patent No.: US 11,734,235 B2
(45) Date of Patent: *Aug. 22, 2023

(54) AUTOMATIC DRIFT DETECTION AND HANDLING

(71) Applicant: StreamSets, Inc., San Mateo, CA (US)

(72) Inventors: Arvind Prabhakar, Sunnyvale, CA (US); Alejandro Abdelnur, Barcelona (ES); Madhukar Devaraju, San Jose, CA (US)

(73) Assignee: StreamSets, Inc., San Mateo, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 17/332,978

(22) Filed: May 27, 2021

(65) Prior Publication Data

US 2021/0286778 A1 Sep. 16, 2021

Related U.S. Application Data

(63) Continuation of application No. 16/010,006, filed on Jun. 15, 2018, now Pat. No. 11,048,673.

(60) Provisional application No. 62/526,096, filed on Jun. 28, 2017.

(51) Int. Cl.
*G06F 16/21* (2019.01)

(52) U.S. Cl.
CPC .......... *G06F 16/213* (2019.01); *G06F 16/211* (2019.01)

(58) Field of Classification Search
CPC .............................. G06F 16/211; G06F 16/213
See application file for complete search history.

(56) References Cited

U.S. PATENT DOCUMENTS

| | | |
|---|---|---|
| 7,610,298 B2 | 10/2009 | Zaytsev et al. |
| 2006/0167880 A1 | 7/2006 | Meijer et al. |
| 2006/0271843 A1 | 11/2006 | Yarde et al. |
| 2008/0082560 A1 | 4/2008 | Agrawal et al. |
| 2011/0197032 A1 | 8/2011 | Patey |
| 2014/0279838 A1 | 9/2014 | Tsirogiannis et al. |
| 2016/0042015 A1 | 2/2016 | Landau et al. |
| 2018/0089232 A1 | 3/2018 | Spektor et al. |
| 2019/0005073 A1 | 1/2019 | Prabhakar et al. |

OTHER PUBLICATIONS

"U.S. Appl. No. 16/010,006, Advisory Action dated Sep. 23, 2020", 3 pgs.
"U.S. Appl. No. 16/010,006, Examiner Interview Summary dated Jun. 8, 2020", 3 pgs.

(Continued)

*Primary Examiner* — Marc S Somers
(74) *Attorney, Agent, or Firm* — Schwegman Lundberg & Woessner, P.A.

(57) ABSTRACT

In various example embodiments, a system, computer readable medium and method for schema update engine dynamically updating a target data storage system. Incoming data records are received. A front-end schema of the incoming data records is identified. The front-end schema and the current target schema are compared. Based on identifying a difference between the front-end schema and the current target schema, the current target schema is updated in order to be identical to the front-end schema. The current target data file is closed and the incoming data records are stored in a new target data file according to the updated target schema.

20 Claims, 4 Drawing Sheets

(56) References Cited

OTHER PUBLICATIONS

"U.S. Appl. No. 16/010,006, Examiner Interview Summary dated Oct. 15, 2020", 2 pgs.

"U.S. Appl. No. 16/010,006, Final Office Action dated Jul. 15, 2020", 18 pgs.

"U.S. Appl. No. 16/010,006, Non Final Office Action dated Mar. 12, 2020", 15 pgs.

"U.S. Appl. No. 16/010,006, Notice of Allowance dated Mar. 10, 2021", 9 pgs.

"U.S. Appl. No. 16/010,006, Response filed Jun. 12, 2020 to Non Final Office Action dated Mar. 12, 2020", 12 pgs.

"U.S. Appl. No. 16/010,006, Response filed Sep. 15, 2020 to Final Office Action dated Jul. 15, 2020", 11 pgs.

"U.S. Appl. No. 16/010,006, Response filed Oct. 15, 2020 to Advisory Action dated Sep. 23, 2020", 11 pgs.

AUTOMATIC DRIFT DETECTION AND HANDLING

CROSS-REFERENCE TO RELATED APPLICATION

This patent application is a continuation of U.S. patent application Ser. No. 16/010,006, filed Jun. 15, 2018, which application claims the benefit of U.S. Provisional Patent Application No. 62/526,096, filed Jun. 28, 2017, entitled "AUTOMATIC DRIFT DETECTION AND HANDLING", which are incorporated by reference herein in their entireties.

TECHNICAL FIELD

The subject matter disclosed herein generally relates to the technical field of special-purpose machines that provide for real-time updates of data record schemas of target data storage systems, including software-configured computerized variants of such special-purpose machines and improvements to such variants, and to the technologies by which such special-purpose machines become improved compared to other special-purpose machines that facilitate provide for real-time updates of data record schemas of target data storage systems.

BACKGROUND

According to conventional systems, front-end computer systems capture data and format the data according to a pre-defined data schema. A pre-defined data schema provides for a label (or name) of each data field and a data type for each respective data field. A pre-defined data schema can be, for example, a data tree(s) structure such that a first data field can be a root of the pre-defined data schema and all other data fields are consider a child of (or dependent on) the first data field.

BRIEF DESCRIPTION OF THE DRAWINGS

Various ones of the appended drawings merely illustrate example embodiments of the present disclosure and cannot be considered as limiting its scope.

Figure 1:
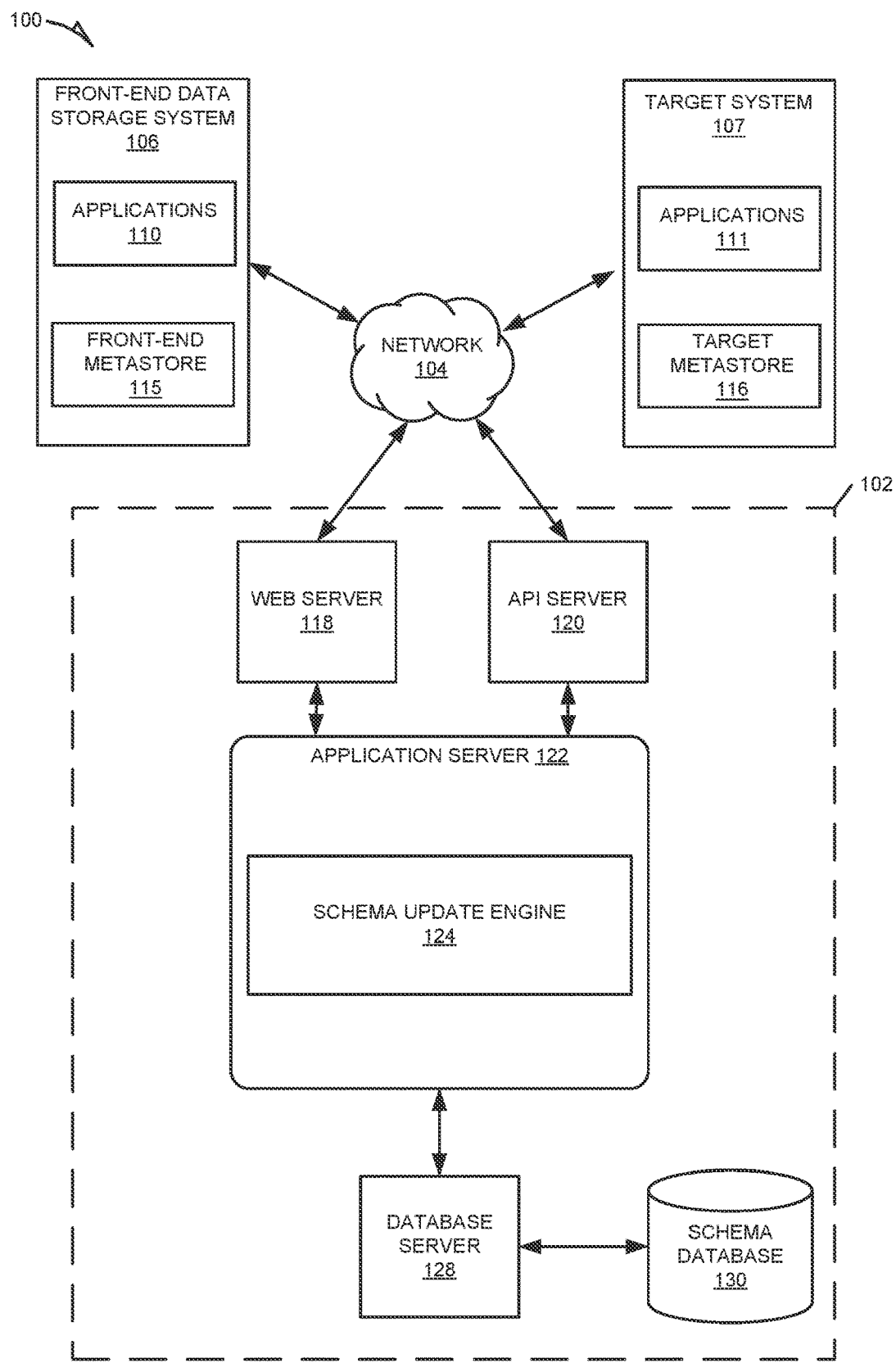
FIG. 1 is a network diagram depicting a computer system, within which one example embodiment of a schema update engine may be deployed, according to an example embodiment.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A system, a machine-readable storage medium storing instructions, and a computer-implemented method described herein are directed to a Schema Update Engine. A front-end system(s) generates data records according to a front-end data schema. Such data records associate data field values with corresponding data types defined according to the front-end schema. Such data records are passed into a back-end data storage system ("target system") for storage according to a back-end schema ("target schema") that should align with the front-end schema. However, the front-end schema can be updated such that a new data field is added, a data field is deleted, a data field is renamed, or a type of a data field is recast to a different type of data field. Once the front-end schema update(s) has occurred, the new data records generated in accordance with the updated front-end schema are no longer in alignment with the target schema that is utilized for storing the new data records. The misalignment is caused by a drift—or real-time difference—between definitions of data fields and their data types in the updated front-end schema and the target schema. A schema update engine identifies the drift and updates the target schema in real-time as data records are passed from the front-end system for storage at the target system. As such, the new data records are stored in the target system according to an updated target schema that aligns with the updated front-end schema. It is understood that drift can be a result of mutation of data characteristics, such as, an authorized user making direct changes to the front-end schema.

It is understood that various embodiments further include encoded instructions that comprise operations to generate a user interface(s) and various user interface elements. The user interface and the various user interface elements can be displayed to be representative of schemas, schema drifts, data field, data records, batches of data records, etc.

It is understood that various embodiments include the generation of one or more modules that comprise source code that, when compiled by a computing device(s), creates object code that causes the computing device(s) to perform one or more operations described herein. In other embodiments, any of the modules comprise object code that causes the computing device(s) to perform various operations described herein. In some embodiments, each module(s) can be permanently configured circuitry, such as ASICs, etc. In various embodiments, all operations of the schema update engine can be performed by a computer system, or computer module(s), or software modules situated between a plurality of data storage systems, such that the schema update engine accesses data records being transmitted between the plurality of data storage systems Other embodiments include the generation of one or more modules that comprise source code that, when compiled by a server computing device(s), creates object code that causes the server computing device(s) to perform one or more operations described herein in communication with one or more client computing devices. In other embodiments, any of the modules comprise object code that causes the server computing device(s) to perform various operations described herein in communication with the one or more client computing devices.

Turning now to FIG. 1, FIG. 1 is a network diagram depicting a computer system 100, within which one example embodiment of a schema update engine may be deployed, according to some embodiments of the invention.

A networked system 102, in the example, provides server-side functionality, via a network 104 (e.g., the Internet or Wide Area Network (WAN)) to one or more data storage systems. FIG. 1 illustrates, for example, application(s) 110 executed at a front-end data storage system 106 (for example a Hadoop file system or a MapR file system) to capture data and format the captured data into one or more data records formatted according to a current version of a front-end data schema stored in a front-end metastore 115. In particular, the data records may be formatted according to a traditional RDBMS format, the data being organized into one or more tables of columns and rows. The metadata includes a schema for each of the tables. The tables may be organized into partitions. Partitions divide a table into related parts based on the values of partitioned columns such as date, city, and department. Partitions make it is easy to query a portion of the data. When the tables are organized into partitions, the metadata may also include partition metadata. A back-end data storage system 107 ("target system")(for example a Hadoop file system or a MapR file system) stores data records in a current target data file according to a current target schema. The target system 107 includes a target metastore 116 storing metadata including the current target schema. The target system 107 further includes an application(s) 111 to store received data records. The schema update engine 124 adds information to a header of each incoming data record received form the front-end system 106 before passing the data record to the target system 107. The target system 107 performs record-based writes to the target system 107 based on a target directory, and optionally a data serialization framework, and/or a columnar storage file format. For example, the schema update engine 124 assembles the path where each incoming data record should be stored, and writes the generated path in a target directory attribute in the record header of each incoming data record. The schema update engine 124 may additionally write a data serialization framework (like Avro) and/or columnar storage file format (like Apache Parquet) to corresponding attributes in the record header of the incoming data record.

An Application Program Interface (API) server 120 and a web server 118 are coupled to, and provide programmatic and web interfaces respectively to, an application server(s) 122. The application server 122 hosts a schema update engine 124. The application server 122 is, in turn, shown to be coupled to a database server(s) 128 that facilitates access to a schema database(s) 130, which stores previously inferred de facto schemas of the front-end data storage system 106. In other embodiments, the schema update engine application 124 can be coupled to a schema cache, which stores previously inferred de facto schemas of the front-end data storage system 106.

While the schema update engine 124 is shown in FIG. 1 to form part of the networked system 102, it will be appreciated that, in alternative embodiments, the schema update engine 124 may form part of a service that is separate and distinct from the networked system 102.

Further, the computer system 100 is of course not limited to such an architecture as shown in FIG. 1, and could equally well find application in a distributed, or peer-to-peer, architecture system, for example. Any portion, or portions, of the schema update engine 124 may reside and be executed from any kind of computing device. The schema update engine 124 could also be implemented as standalone software program(s), which does not necessarily have networking capabilities.

Figure 2:
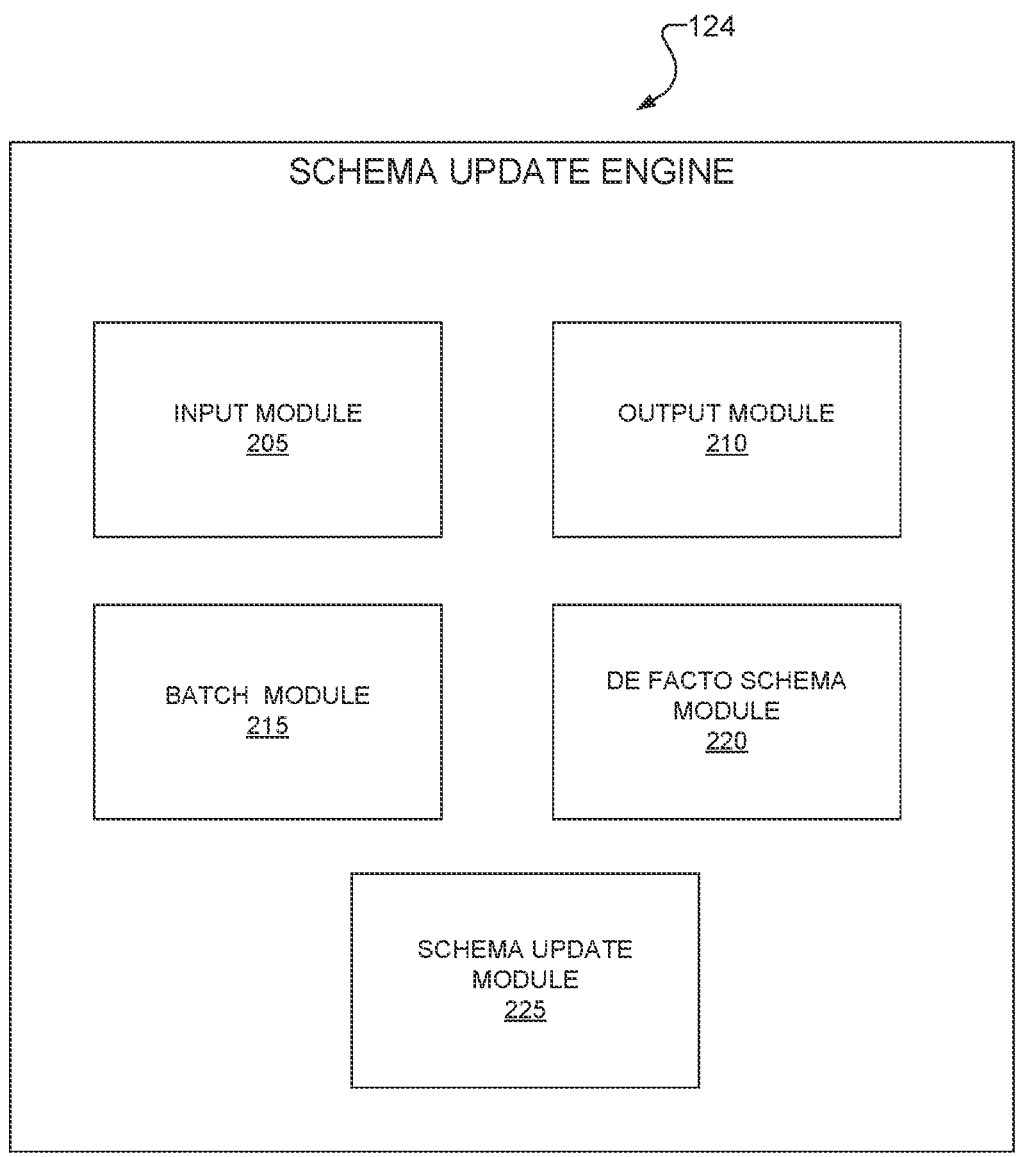
FIG. 2 is a block diagram showing example components of a Schema Update Engine, according to some embodiments.

FIG. 2 is a block diagram showing example components of a schema update engine, according to some embodiments.

The input module 205 controls, manages and stores information related to any inputs from one or more components of system 102 as illustrated in FIG. 1. In various embodiments, the inputs include one or more data records transmitted between data storage systems. For example, the input can be a batch of data records being sent from a front-end data storage system to a target data storage system, such as a back-end data storage system.

The output module 210 controls, manages and stores information related to which sends any outputs to one or more components of a target data storage system. In some embodiments, the output is an operation(s), or an operation call(s), that modifies at least a portion of a data schema of target data storage system.

The batch module 215 manages, controls, stores, and accesses information related to collecting one or more data records transmitted from a data storage system. For example, the batch module 315 collects a batch of incoming data records being sent from a front-end data storage system to a target data storage system.

The de facto schema module 220 manages, controls, stores, and accesses information related to inferring a de facto schema of a data storage system. For example, de facto schema module 320 determines whether a drift has occurred in the data schema of the data storage system that is the source of incoming data records.

The schema update module 225 manages, controls, stores, and accesses information related to updating a target data schema of a target data storage system. Based on detecting a drift of in the data schema of the data storage system that is the source of incoming data records, the schema update module 225 accesses a target data schema of a target data storage system in order to update the target data schema.

Figure 3:
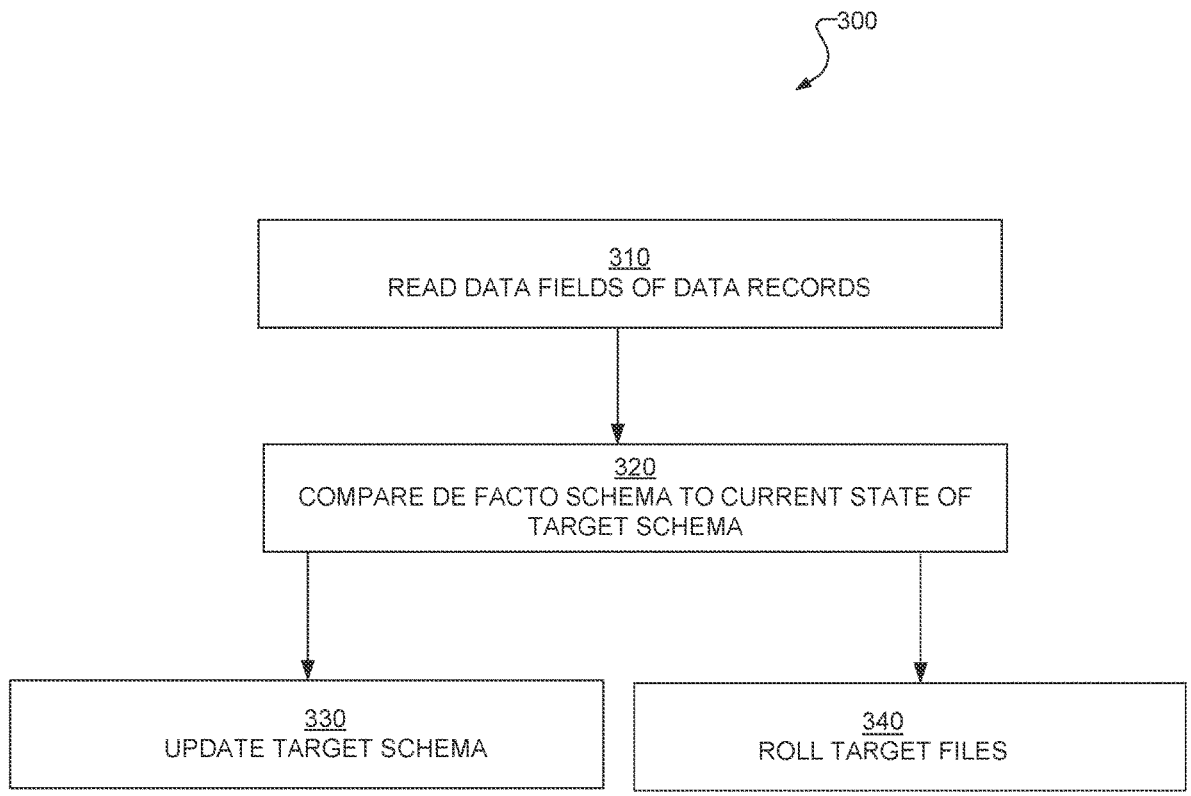
FIG. 3 is a flowchart illustrating an example method for updating a target data schema of a target data storage system, according to an example embodiment.

FIG. 3 is a flowchart 300 illustrating an example method for updating a target data schema of a target data storage system, according to an example embodiment.

The schema update engine 124 performs a metadata analysis of a batch of data records being sent to the target system 107. At operation 310, the schema update engine 124 reads data fields of the data records in the batch and generates a de facto schema. The de facto schema represents the current state of the front-end data schema—as detected by the schema update engine 124. For example, the schema update engine 124 extracts the data fields of the incoming data records of a batch; and generates the de facto schema based on the extracted data fields by combining the extracted data fields and removing duplicate extracted data fields. This can be done via a union operation of the extracted data fields. For example, the schema update engine 124 iterates through each data record in the batch and adds data fields—that are extracted from the respective data records—to the de facto schema via a union operation of the read data fields. A union operation can be performed using a UNION operator. The UNION operator combines all the data fields of the data records in the batch, and removes duplicate rows to generate the de facto schema. The schema update engine 124 accesses the target system 107 to obtain a target schema definition, which represents a current state of the target data schema ("target schema").

At operation 320, the schema update engine 124 compares the de facto schema to the current state of the target schema. Upon detecting a difference in the de facto schema (such as a new data field, a deleted data field, a recast data type of data field, a renamed data field), the schema update engine 124 identifies one or more operations (e.g., read, write, delete) to be performed on the target schema definition to update the target schema such that it is in alignment (i.e. the same as) the de facto schema. For example, when the difference between the front-end schema and the current target schema is an added data field, the operation to be performed is adding the added data field to the current target schema. When the difference between the front-end schema and the current target schema is a deleted data field, no operation is to be performed on the current target schema, the deleted data field should simply be ignored when storing the incoming data records. When the difference between the front-end schema and the current target schema is a recast data type of a data field, the operation to be performed is recasting the type of the data field of the current target schema. When the difference between the front-end schema and the current target schema is a renamed data field, the operation to be performed is renaming the data field of the current target schema. In the case of a database table structure, when the difference between the front-end schema and the current target schema is a new table, the schema update engine 124 creates the table structure inferred from the read incoming data fields. When the difference between the front-end schema and the current target schema is a partition of a table, the operation to be performed is creating a partition of the table in the target schema. When the difference between the front-end schema and the current target schema is one or more columns and/or rows, the operation to be performed is adding one or more columns and/or rows at which the new data fields/types will be listed.

In an exemplary embodiment, the schema update engine 124 detects drift by reading data fields (such as a database table structure) of one or more incoming data records. The read data fields are compared to a cached target schema. If a first comparison returns a difference between the read data fields and the cached target schema, the current target schema is accessed at the target system and the read data fields are compared again to the current target schema. If a second comparison returns a difference between the read data fields and the current target schema, the schema update engine 124 has detected a drift between the front-end schema and the target schema. The schema update engine 124 writes, to a target schema definition file of the target system, the database table structure of the read incoming data records in order to update the target schema. The schema update engine 124 replaces the previously cached target schema by placing the updated target schema in the cache.

However, if the first comparison returns no difference between the read data fields and the cached target schema, the schema update engine 124 still runs the second comparison between the read data fields and the current target schema. If the second comparison returns a result representing that the same table structure inferred from the read data fields is present in the target schema, then there is no drift detected. However, if the inferred table structure is not present in the target schema, then a drift has been detected.

At operation 330, the schema update engine 124 instructs the target system 107 to update the target schema. In some embodiments, the schema update engine 124 writes, to a target schema definition file of the target system, the operations to be performed on the current target schema in order to update the current target schema. In particular, the schema update engine 124 may generate a metadata record that describes the operations to be performed and send it to the metastore 116 of the target system. The metastore 116 updates the target schema by performing the operations described in the metadata record on the current target schema. In other embodiments, the schema update engine 124 writes, to a target schema definition file of the target system, the updated target schema to be used instead of the current target schema. In particular, the schema update engine 124 may generate a metadata record that describe the updated target schema and send it to the target metastore 116. The target megastore 116 updates the target schema by replacing the current target schema with the updated target schema. When the target metastore 116 receives the metadata record, it may first compare the updated target schema with the current target schema and based on this comparison only performs the operations that need to be performed on the target schema to update it according to the updated target schema.

At operation 340, the schema update engine 124 instructs the target system 107 to roll target files, namely close the current target file, open a new target file generated according to the updated target schema and store the incoming data records in the new target data file. Operation 340 may be performed simultaneously with operation 330. schema update engine For example, the schema update engine 124 may add information to the header of each incoming data record before passing the records to the target system 107. In particular, the schema update engine 124 may add a roll indicator in a corresponding attribute in the record header of the incoming data record. Upon receiving the incoming data record and reading the roll indicator in the record header, the target system 107 closes the current target file, generates a new target data file based on the updated schema and writes the incoming data record in the new target data file according to the updated target schema.

Computer System(s)

Figure 4:
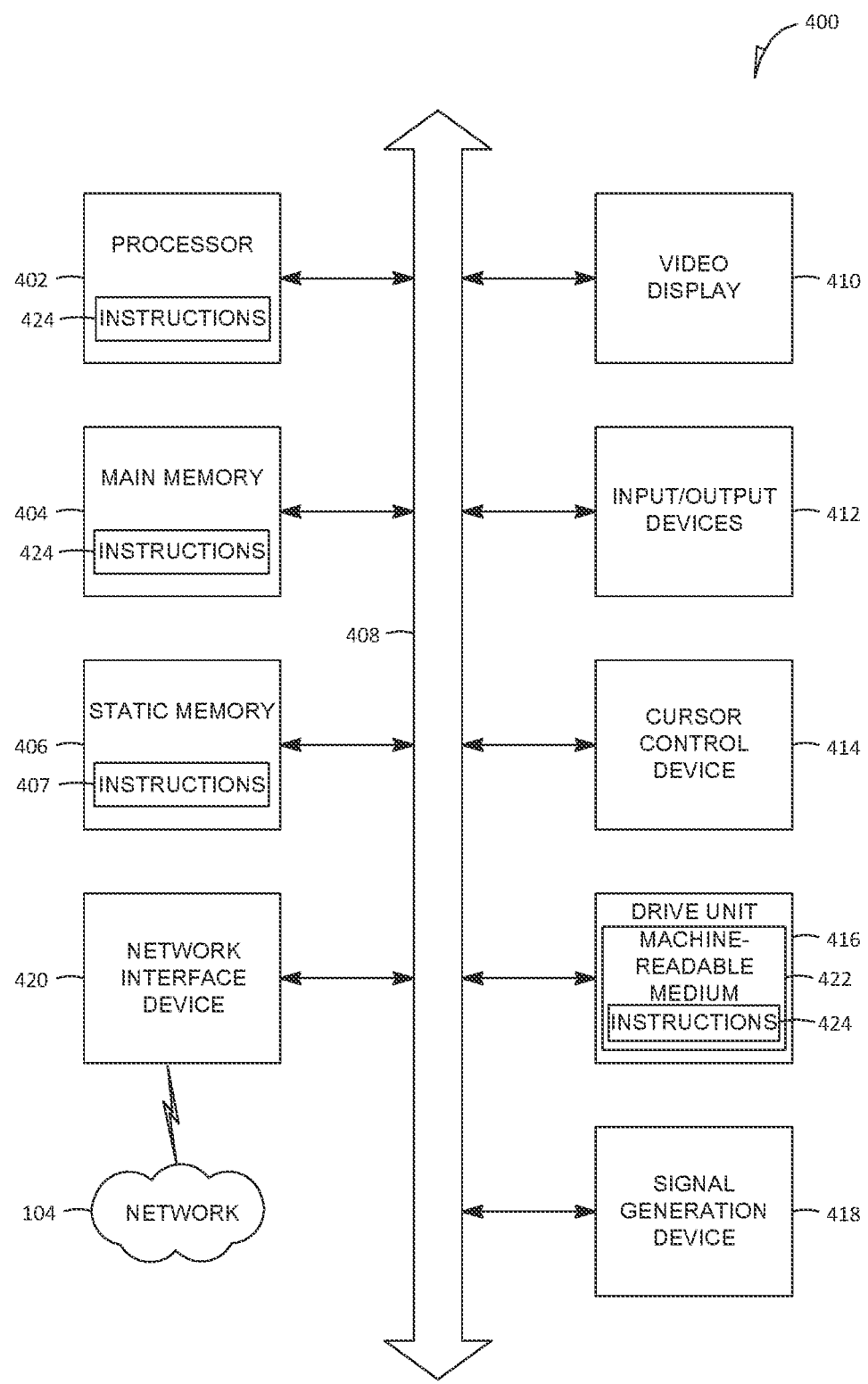
FIG. 4 shows a diagrammatic representation of machine in the example form of a computer system within which a set of instructions, for causing the machine to perform any one or more of the methodologies discussed herein, may be executed.

FIG. 4 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU) a graphics processing unit (GPU) or both), a main memory 404 and a static memory 406 (with one or more sets of instructions 407) which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions 424 (e.g., software) embodying any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 104 via the network interface device 420.

While not illustrated, it is understood that that computer system 400 can further include sensors that create data regarding a thermal state of the computer system 400, an orientation of the computer system 400 and a current location of the computer system 400. In various embodiments, the computer system 400 includes a temperature sensor, an accelerometer and/or a global position system for identifying the current location of the computer system 400.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the subject matter described herein. The term "machine-readable medium" shall accordingly be taken to include, but not be limited to, solid-state memories, optical and magnetic media, and carrier wave signals.

Thus, a method(s) and system(s) to detect a thermal state(s) and position(s) of a computing device are disclosed herein in accordance with various embodiments. Although the subject matter herein has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A computer implemented method comprising:
   receiving incoming data records;
   identifying a front-end schema of the incoming data records;
   accessing a current target schema; and
   based on identifying a difference between the front-end schema and the current target schema:
   adding a plurality of roll indicators in a plurality of record headers of the incoming data records;
   reading the plurality of record headers comprising the plurality of roll indicators;
   in response to reading the plurality of record headers comprising the plurality of roll indicators, closing the current target data file; and
   storing the incoming data records.

2. The method of claim 1, wherein identifying the front-end schema of the incoming data records comprises:
   collecting the incoming data records into batches;
   extracting data fields of the incoming data records of a batch; and
   generating a de facto schema based on the extracted data fields, the de facto schema being considered as the front-end schema.

3. The method of claim 2, wherein generating the de facto schema based on the extracted data fields comprises combining the extracted data fields and removing duplicate extracted data fields.

4. The method of claim 1, further comprising:
   comparing the front-end schema to the current target schema.

5. The method of claim 4, wherein comparing the front-end schema to the current target schema further comprises:
   based on identifying no difference between the front-end schema and the cached target schema, accessing the current target schema, comparing the front-end schema to the current target schema, and updating the cached target schema with the current target schema.

6. The method of claim 4, wherein comparing the front-end schema to the current target schema further comprises:
   comparing the front-end schema to a cached target schema; and
   based on identifying a difference between the front-end schema and the cached target schema, accessing the current target schema, comparing the front-end schema to the current target schema, and updating the cached target schema with the current target schema.

7. The method of claim 1, wherein the difference between the front-end schema and the current target schema is any one or more of an added data field, a deleted data field, a recast data type of data field, or a renamed data field.

8. The method of claim 1, wherein further comprising:
   generating a metadata record describing data operations to be performed on the current target schema to reconcile the identified difference between the front-end schema and the current target schema;
   transmitting the metadata record to a target metastore, the target metastore configured to perform the data operations described by the metadata record on the current target schema;
   receiving, from the target metastore, an updated target schema that is identical to the front-end schema;
   updating the current target schema using the updated target schema received from the target metastore wherein updating the current target schema comprises creating a partition in the current target schema, adding one or more data field to the current target schema, renaming one or more data field of the current target schema, or recasting a type of a data field of the current target schema to a different type of data field.

9. A computer system comprising:
   a memory to store computer executable instructions; and
   at least one computer processor coupled to the memory to execute the instruction, that upon execution perform operations comprising:

receiving incoming data records;
identifying a front-end schema of the incoming data records;
accessing a current target schema; and
based on identifying a difference between the front-end schema and the current target schema:
adding a plurality of roll indicators in a plurality of record headers of the incoming data records;
reading the plurality of record headers comprising the plurality of roll indicators;
in response to reading the plurality of record headers comprising the plurality of roll indicators, closing the current target data file; and
storing the incoming data records.

10. The system of claim 9, wherein identifying the front-end schema of the incoming data records comprises:
collecting the incoming data records into batches;
extracting data fields of the incoming data records of a batch; and
generating a de facto schema based on the extracted data fields, the de facto schema being considered as the front-end schema.

11. The system of claim 10, wherein generating the de facto schema based on the extracted data fields comprises combining the extracted data fields and removing duplicate extracted data fields.

12. The system of claim 9, further comprising:
comparing the front-end schema to the current target schema.

13. The system of claim 12, wherein comparing the front-end schema to the current target schema comprises:
comparing the front-end schema to a cached target schema;
based on identifying a difference between the front-end schema and the cached target schema, accessing the current target schema, comparing the front-end schema to the current target schema, and updating the cached target schema with the current target schema.

14. The system of claim 12 wherein comparing the front-end schema to the current target schema further comprises:
based on identifying no difference between the front-end schema and the cached target schema, accessing the current target schema, comparing the front-end schema to the current target schema, and updating the cached target schema with the current target schema.

15. The system of claim 9, wherein the difference between the front-end schema and the current target schema is an added data field, a deleted data field, a recast data type of data field, or a renamed data field.

16. The system of claim 9, further comprising:
generating a metadata record describing data operations to be performed on the current target schema to reconcile the identified difference between the front-end schema and the current target schema;
transmitting the metadata record to a target metastore, the target metastore configured to perform the data operations described by the metadata record on the current target schema;
receiving, from the target metastore, an updated target schema that is identical to the front-end schema;
updating the current target schema using the updated target schema received from the target metastore wherein updating the current target schema comprises creating a partition in the current target schema, adding one or more data field to the current target schema, renaming one or more data field of the current target schema, or recasting a type of a data field of the current target schema to a different type of data field.

17. A non-transitory computer readable medium storing instructions thereon, which when executed by a processor cause a computer system to perform operations comprising:
receiving incoming data records;
identifying a front-end schema of the incoming data records;
accessing a current target schema; and
based on identifying a difference between the front-end schema and the current target schema:
adding a plurality of roll indicators in a plurality of record headers of the incoming data records;
reading the plurality of record headers comprising the plurality of roll indicators;
in response to reading the plurality of record headers comprising the plurality of roll indicators, closing the current target data file; and
storing the incoming data records.

18. The computer readable medium of claim 17, wherein identifying the front-end schema of the incoming data records comprises:
collecting the incoming data records into batches;
extracting data fields of the incoming data records of a batch; and
generating a de facto schema based on the extracted data fields, the de facto schema being considered as the front-end schema.

19. The computer readable medium of claim 18, wherein generating the de facto schema based on the extracted data fields comprises combining all the extracted data fields and removing duplicate extracted data fields.

20. The computer readable medium of claim 17, further comprising:
comparing the front-end schema to the current target schema.

* * * * *